(12) United States Patent
Russell et al.

(10) Patent No.: US 11,549,912 B2
(45) Date of Patent: Jan. 10, 2023

(54) COLLAPSIBLE PIPELINE INSPECTION TOOL

(71) Applicant: PICA Pipeline Inspection and Condition Analysis Corporation, Edmonton (CA)

(72) Inventors: David E. Russell, Edmonton (CA); David Burton, Edmonton (CA)

(73) Assignee: PICA Pipeline Inspection and Condition Analysis Corporation, Edmonton (CA)

( * ) Notice: Subject to any disclaimer, the term of this patent is extended or adjusted under 35 U.S.C. 154(b) by 50 days.

(21) Appl. No.: 17/202,139

(22) Filed: Mar. 15, 2021

(65) Prior Publication Data
US 2022/0291170 A1  Sep. 15, 2022

(51) Int. Cl.
*G01N 27/9013* (2021.01)
*G01N 27/90* (2021.01)
*F16L 55/44* (2006.01)
*F16L 101/30* (2006.01)

(52) U.S. Cl.
CPC ............ *G01N 27/902* (2013.01); *F16L 55/44* (2013.01); *G01N 27/9006* (2013.01); *F16L 2101/30* (2013.01)

(58) Field of Classification Search
CPC .......... G01N 27/90–9093; F16L 55/26; F16L 55/28; F16L 55/40; F16L 55/44; F16L 2101/00; F16L 2101/30
USPC ......................................................... 324/220
See application file for complete search history.

(56) References Cited

U.S. PATENT DOCUMENTS

| | | | |
|---|---|---|---|
| 7,143,659 B2* | 12/2006 | Stout ........................ | F17D 5/00 73/865.8 |
| 8,146,449 B2* | 4/2012 | Rosen .................... | G01N 27/90 73/865.8 |
| 11,098,838 B2* | 8/2021 | Grote ...................... | F16L 55/38 |

* cited by examiner

*Primary Examiner* — Judy Nguyen
*Assistant Examiner* — Rahul Maini
(74) *Attorney, Agent, or Firm* — Christensen O'Connor Johnson Kindness PLLC

(57) ABSTRACT

An in-line inspection (ILI) tool 20 for use inspecting pipelines includes a plurality of collapsible guide centralizers 100 configured and sized to correspond to the inside diameter of the pipeline being inspected. The guide centralizes 100 include wheels 102 roll along the inside wall of the pipeline being inspected to maintain the guide centralizers "centered" within the pipeline. A collapsible exciter unit centralizer 200 is positioned between collapsible guide centralizers 100 to "center" the exciter unit centralizer relative to the interior of the pipeline. The exciter unit centralizer 200 generates signals in the form of an alternating magnetic field that travel along the wall of the pipeline which in turn generates eddy current signals. The eddy current signals undergo a change if a discontinuity in the pipeline is encountered by the inspection tool 20, which signal change or deviation is detected by a collapsible detector unit centralizer 300 positioned between the collapsible guide centralizers 100.

23 Claims, 15 Drawing Sheets

COLLAPSIBLE PIPELINE INSPECTION TOOL

BACKGROUND

Corrosion and leaks in pipelines, especially in the water and the wastewater industry, are particularly serious problems. It has been estimated that on average in North America, only 70% of the water that is treated for drinking actually makes it to the taps of consumers. The 30% that is "lost" leaks out of joints that are not well sealed, or out of corroded-through holes in the pipes into the ground, causing contamination from the chlorine used to treat the water. Leaks from wastewater pipes are even more polluting due to the phosphates (from washing machines) and other chemicals that are flushed down our drains and mix with water from industrial users before reaching the treatment plant.

In order to detect the location of corroded areas and leaks, pipeline owners employ "in-line inspection (ILI) Tools" which use a variety of non-destructive testing (NDT) methods to interrogate the pipe. These ILI Tools use techniques such as Magnetic Flux Leakage (MFL), Ultra-sonic Technology (UT), or Remote Field Technology (RFT).

To access the pipelines, especially in the oil and gas marketplace, the pipelines are equipped with "pig launchers" and pig receivers" which are connected to the pipeline through "riser pipes." The water and wastewater industry are not as advanced as the oil and gas industry, where ILI Tools have been in use for almost a century. Because of this, water and wastewater pipelines were not designed to have "pig launchers" and "pig receivers" fabricated and installed when the pipeline is first built, and it is very costly to install them after the pipe has been in service for many years.

For metallic pipelines (made of steel, cast-iron, ductile-iron, and concrete pressure pipe), the ravages of corrosion are the same as for oil and gas pipelines. While pipe wall thicknesses are generally thicker than pipe used in oil and gas applications, and the pressures are typically lower, the protection that is provided to the pipes to protect from soil side ground-water corrosion is usually quite limited, and therefore soil-side corrosion is common and causes many failures of these pipelines. In water pipelines in North America, the leakage rate due to corroded through holes can be as high as 30%, and thus never make it to the faucets of customers. This has environmental consequences through chlorinated water being introduced into the water table and extra costs for pumping and water treatment. In water-starved states such as Nevada and Arizona, this loss of water is a serious threat to sustaining sources of water for domestic use. Hence, the water industry is driven to inspect their pipes for corroded and weakened areas, and ILI tools are very good technology for that purpose, especially for large transmission mains.

Large water and wastewater transmission mains can vary in size from 16 inches to over 120 inches in diameter, and the larger mains are often equipped with manways, enabling inspection and internal repairs of the pipes periodically. Manways offer a low-cost means of accessing the pipelines; however, many ILI Tools cannot fit through the manway unless they are completely dis-assembled, passed through the manway in pieces, and re-assembled inside the pipe. This is a time-consuming exercise, which can take a full day for assembly and then another day for dis-assembly after the pipe is inspected.

The present disclosure seeks to address the forgoing short comings in current systems and methods for inspecting water and wastewater lines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a collapsible centralizer is provided for positioning measuring/testing equipment within the interior of the pipeline while traveling through the pipeline. The collapsible centralizer includes a hub portion defining a longitudinal axis extending through the hub portion, and a collapsible superstructure encircling the hub portion, and a plurality of tethering lines radiating from the hub portion to the collapsible superstructure to inter-connect the superstructure relative to the hub portion.

In any of the embodiments described herein, wherein, when in collapsed configuration, the superstructure occupies a reduced configuration relative to when in erected configuration, and when in erected configuration, the superstructure encircles the hub portion with the tethering lines in taut condition.

In any of the embodiments described herein, wherein the collapsible superstructure is inflatable into erected configuration and deflatable into collapsed configuration.

In any of the embodiments described herein, wherein the inflatable superstructure comprises an inflatable toroid that encircles the hub portion.

In any of the embodiments described herein, wherein the tethering lines are loaded under tension when the collapsible superstructure is in erected configuration.

In any of the embodiments described herein, further comprising tensioners for adjusting the tension load on the tethering lines when the superstructure is in erected configuration.

In any of the embodiments described herein, wherein the superstructure when erected is configured to carry a component selected from the group consisting of guide wheels, signal generators, and signal detectors through the pipeline.

In any of the embodiments described herein, wherein the selected component is mounted on the superstructure when the superstructure is in collapsed configuration so that when the superstructure is erected, the component is in position to perform its function.

In any of the embodiments described herein, wherein the guide wheels are mounted on trucks disposed about the circumference of the superstructure to axle the guide wheels about axes transvers to the longitudinal axis of the hub section.

In any of the embodiments described herein, wherein the signal detectors comprise sensors disposed within pods spaced along the circumference of the superstructure.

In any of the embodiments described herein, wherein the pods are mounted on the superstructure by resilient mounting structures to enable the pods to retract toward the superstructure when subjected to a load.

In any of the embodiments described herein, further comprising a signal receiver module which is paired with the signal detectors, said signal receiver module disposed within the hub structure.

In any of the embodiments described herein, comprising signal exciter units positioned around the circumference of the superstructure.

In any of the embodiments described herein, further comprising a signal exciter module which is paired with the signal exciter units, said signal exciter module disposed within the hub structure.

In any of the embodiments described herein, wherein the hub structure is configured to receive and carry a component selected from the group consisting of a battery, a signal exciter module, a signal receiver, a signal processor, a signal transmitter, a signal recorder.

In any of the embodiments described herein, wherein a signal exciter module is carried by the hub structure and is paired with signal exciter units carried by the superstructure.

In any of the embodiments described herein, wherein a signal receiver is carried by the hub structure and is paired with signal detectors carried by the superstructure.

In any of the embodiments described herein, wherein the hub portions of the collapsible centralizers are interconnected together.

In accordance with one embodiment of the present disclosure, an in-line inspection tool for a pipeline includes a plurality of centralizers, each comprising a hub portion defining a longitudinal axis extending through the hub portion; an inflatable superstructure encircling the hub portion; and a plurality of tethering lines radiating from the hub portion to the superstructure to position the superstructure relative to the hub portion; Further the superstructure when inflated is configured to carry a component selected from the group consisting of guide wheels, signal generators, and signal detectors through the pipeline.

In any of the embodiments described herein, further comprising an exciter module which is paired with the signal generators, and a signal receiver module which is paired with the signal detectors; and wherein the signal exciter module and signal receiver module are disposed within a respective hub structure.

In accordance with one embodiment of the present disclosure, a method is provided for deploying a collapsible in-line inspection tool into a pipeline having an access location. The method includes: placing at least one collapsed guiding centralizer into the pipeline through the access location; placing an exciter unit mounted on a collapsed centralizer into the pipeline through the access location; placing a detector unit mounted on a collapsed centralizer into the pipeline through the access location; linking together the guiding centralizers with the exciter unit centralizer and the detector unit centralizer; and transforming the guiding centralizers, the exciter unit centralizer and the detector unit centralizer into erected configuration.

In any of the embodiments described herein, the centralizers comprise inflatable superstructures that encircle the hub sections and transform the at least one guiding centralizer, the exciter unit centralizer, and the detector unit centralizer into erected configuration by inflating the respective superstructures.

In any of the embodiments described herein, wherein the superstructures comprise inflatable toroids that encircle the hub sections.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter, and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

Figure 1:
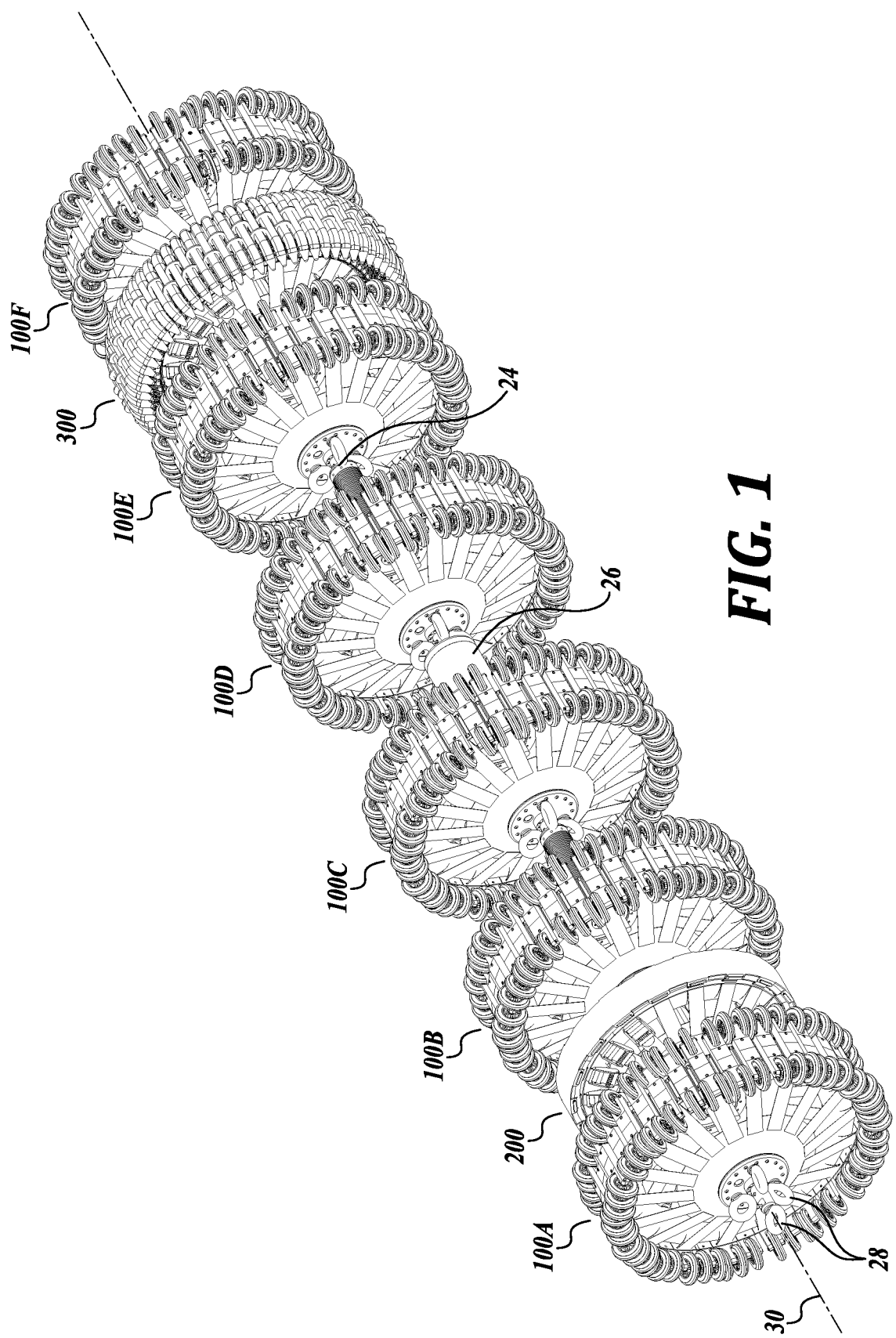
FIG. 1 is a pictorial view of a collapsible in-line inspection tool in accordance with the present disclosure.
Figure 2:
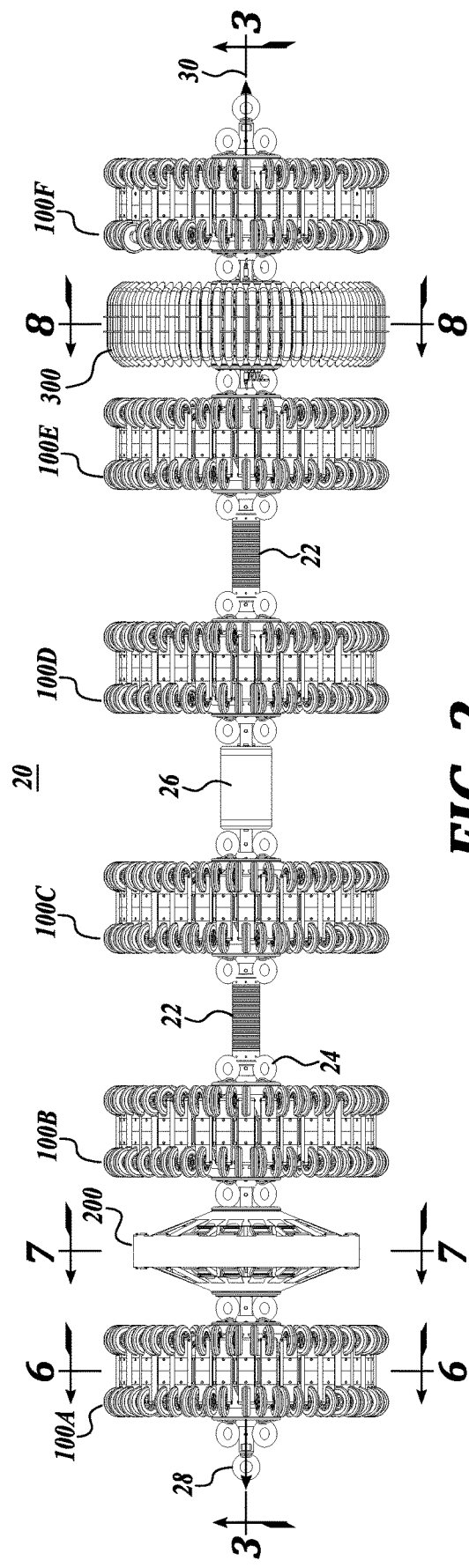
FIG. 2 is a side elevational view of FIG. 1.
Figure 3:
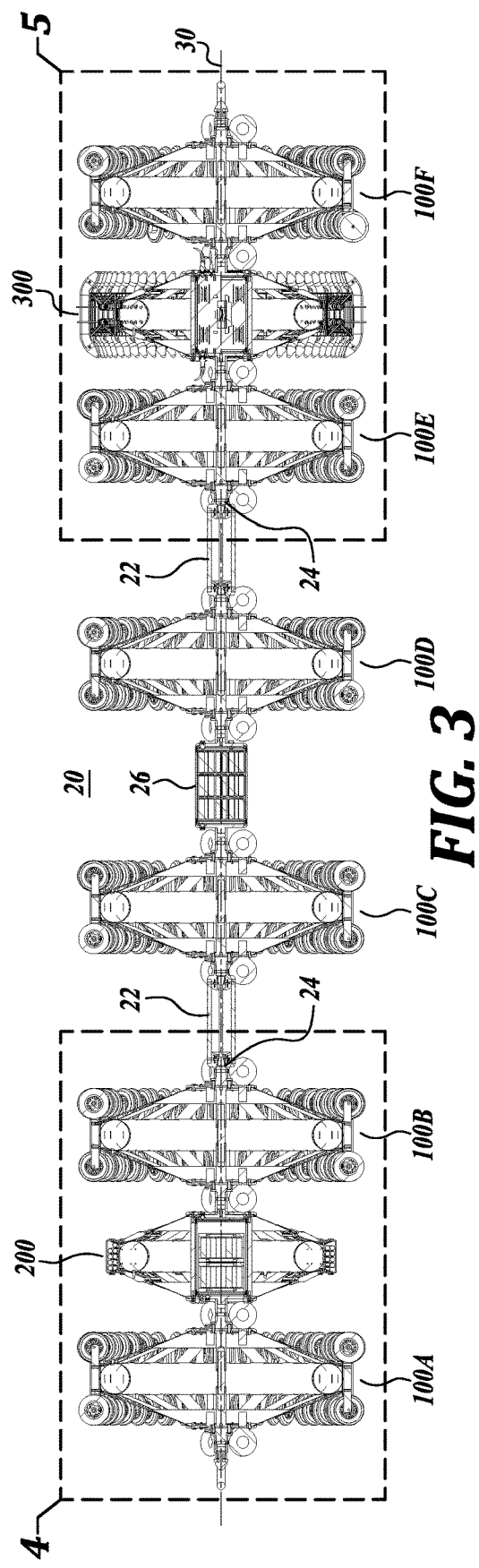
FIG. 3 is a cross-sectional view of FIG. 2, taken along lines 3-3 thereof.

One embodiment of an in-line inspection (ILI) tool 20 for use inspecting pipelines in accordance with the present disclosure is shown in FIGS. 1, 2, and 3. As depicted the ILI tool 20 includes a plurality of collapsible guide centralizers 100A, 100B, 100C, 100D, 100E, and 100F (generically "100"). The guide centralizers 100 are configured and sized to correspond to the inside diameter of the pipeline being inspected. To this end, the wheels 102 of the guide centralizers 100 roll along the inside wall of the pipeline being inspected A collapsible exciter unit centralizer 200 is positioned between collapsible guide centralizers 100A and 100B so as to "center" the exciter unit centralizer relative to the interior of the pipeline being inspected. As explained below, the exciter unit centralizer 200 generates signals in the form of an alternating magnetic field that travels along the wall of the pipeline, which in turn generates eddy current signals. The eddy current signals undergo a change if a discontinuity in the pipeline is encountered by the inspection tool 20, which signal change or deviation is detected by a collapsible detector unit centralizer 300 positioned between the collapsible guide centralizers 100E and 100F.

Linkage units 22 interconnect the collapsible guide centralizes 100B and 100C as well as collapsible guide centralizers 100D and 100E. Swivel connectors 24 are interposed between the ends of the linkage units 22 and the guide centralizes 100 so that the guide centralizes can navigate around corners and turns and other nonlinear features of the pipeline. Also, a battery unit 26 is disposed between collapsible guide centralizers 100C and 100D to provide power for the ILI tool 20, including the collapsible exciter unit centralizer 200 and the collapsible detector unit centralizer 300.

As shown in FIGS. 1 and 2, eye bolts 28 are located at the ends of the ILI tool 20 for towing the tool through the pipeline and for applying a resisting or restraining force on the trailing end of the tool so that the tool remains in taught configuration during use. As a consequence, the collapsible exciter centralizer 200 and the collapsible detector centralizer 300 remain properly centered relative to the pipeline being inspected.

Next, describing the collapsible guide centralizers 100 on more detail, as shown in FIGS. 4, 5, 6, 10A, 10B, 14, and 15, in basic construction, the guide centralizers 100 include a hub portion 104 that defines a longitudinal axis 30. A collapsible superstructure 118 surrounds the hub portion and is tied to the hub portion by a series of restraining or tethering straps or lines 120 that radiate out from the hub portion. In one form of the present disclosure, the collapsible superstructure can be in the form of a toroid, and moreover the toroid can be inflatable and deflatable. When inflated, the toroid superstructure 118 carries and supports a series of wheels 102 extending around the circumference of the guide centralizer 100 to roll along the inside wall of the pipeline being inspected. When deflated, the toroid is collapsed into a smaller configuration so as to be insertable into a pipeline and removed from the pipeline through an opening that is smaller than the size of the centralizer 100 when the superstructure is erected/the toroid is inflated. Nonetheless, the wheels are mounted on the superstructure 118 so that before or after the toroid superstructure is inflated, it is not necessary to mount the wheels to the superstructure; rather it is only necessary to erect (inflate) the superstructure wherein the wheels are in proper position on the superstructure for use of the guide centralizer to be used for inspecting the pipeline.

The hub portion 104, includes a longitudinal axle 106 extending centrally through the hub portion along axis 30. A pair of flexible discs 108 are mounted stationary in spaced apart relationship relative to the axle 106 by inner and outer clamping discs 110 and 112 disposed on opposite sides of each of the flexible discs 108. The inner and outer clamping discs 110 and 112 are significantly smaller in diameter than the flexible discs 108 so that outer diameter of the flexible discs extend radially a distance beyond the outer circumference of the clamping discs 110 and 112. The inner and outer clamping discs 110 and 112 have hub portions 114 and 116, respectively, to retain the inner and outer discs 110 and 112 stationary relative to the axle 106.

The restraining/tethering straps 120 radiate outwardly from the flexible discs 108 to engage the erectable superstructure/inflatable toroid 118. In this regard, the straps 112 extend radially outwardly from a first flexible disc to pass through a first slot 122 formed in a side margin of an outer ring 124 that closely surrounds the outer circumference of the toroid 118. The strap extends around a restraining rod 126, then back down through the slot 122 to wrap around the inward portion of the toroid facing radially inwardly toward the axis 30, to then extend outwardly through a second slot 128 formed in the opposite side margin of the outer ring 114. Thence, the strap extends around a second restraining rod 130 and then back down through the second slot 128 to the second flexible disc 108. The ends of the straps 120 can be securely attached to the flexible discs by any convenient means, for example, by thermal welding, by an adhesive, by a mechanical fastener, or a combination of these or other fastening means.

The inflatable configuration of the toroid 118 can be composed of any suitable flexible material capable of containing pressurized air, for example, a polyurethane material that may be composed of reinforcing fabric, or a Mylar material or other tough, durable, but flexible material. Moreover, the toroid can be composed of a layered construction to optimize the composition of the toroid.

The cross-sectional diameter of the toroid 118 can be sized based on the size of the pipeline being inspected. In this regard, the cross-sectional diameter of the toroid 118 may be from about 30 inches to about 120 inches. One or more valves are provided through which the toroid may be inflated. By employing multiple valves, the likelihood of the valve being in convenient position for inflation is increased.

The restraining/tethering straps 120 may also be composed of flexible material, but that is capable of carrying the tension load. In this regard, the flexible material can be composed of, for example, a polyurethane fabric material. Similarly, the flexible discs 108 may be composed of a strong tough flexible material such as the type of polyurethane. Of course, other types of materials may be employed to form the restraining straps 120 and the flexible discs 108. Further, the flexible discs 108 and restraining straps 120 could be replaced with other structures that function to position the erected superstructure/inflated toroid 118 relative to axle 106.

Continuing to refer to FIGS. 4, 5, 6, 10A, 10B, 14, and 15, wheels 102 are mounted on trucks 132 that extend transversely to the outer surface of the toroid in a direction aligned with axis 30. The trucks 132 are in the form of an elongate beam structures 134 which are mounted to the outer surface of the outer ring 124 by hardware members 136 that extend through being structures 134 to engage the outer ring. At one end, the trucks 132 are defined by spaced apart arms 138 for receiving wheel 102 therebetween. The wheel 102 is rotationally mounted on an axle 140 that spans between the arms 138. At the other end, the trucks are defined by a longitudinally projecting central arm 142 for supporting wheels 102 on each side thereof through the use of an axle 144 extending through an axle housing formed at the distal end of the central arm.

As shown, the positions of the trucks 132 are alternated or reversed about the circumference of the outer ring 124. It will be appreciated by the foregoing construction and positioning of the trucks 132 that the wheels 102 can be positioned in close relationship to each other, thereby to provide adequate support for the guiding centralizer 100 when traveling through a pipeline, and in particular when rounding the corner or a bend in the pipeline, wherein the wheels 102 ride against the adjacent surface of the pipeline inside wall without having to use relatively large diameter wheels.

The wheels 102 are constructed with solid tires having a smooth circumferential rolling surface composed of rubber, a rubber like composition, plastic, or a plastic-like composition so as to not damage the interior of the pipeline, even if the pipeline has been lined with cement mortar, polyurethane, high-density polyurethane epoxy, or other material.

It will be appreciated that by mounting the trucks 132 on the outer ring 124, when the superstructure 118 is erected (e.g., the toroid 118 is inflated), the trucks 132 and the corresponding wheels 102 are in position to perform their guiding function during the inspection of the pipeline, without requiring assembly of the trucks to the superstructure after the guide centralizer has been positioned within the interior of the pipeline to be inspected.

Next referring primarily to FIGS. 4, 7, 13, and 14, the collapsible exciter unit centralizer 200 is illustrated as including a hub portion 202 connected to adjacent inflatable centering/guiding centralizer's 100 using swivel joints between. A collapsible/erectable superstructure in the form of an inflatable toroid 204 surrounds the hub portion and is tied to the hub portion by a series of restraining straps or lines 206 that radiate out from the hub portion. When inflated, the toroid 204 carries and supports a plurality of exciter coils 208 extending around the circumference of the toroid.

The hub portion 202 includes an outer shell 210 for receiving one or more exciter coils 212 therein. Flexible discs 214, similar to flexible discs 108, are positioned between the outer shell 210 and exterior clamping rings 216 located at each end of the hub portion 202. The clamping rings 216 may be clamped together and against the ends of the outer shell 210 by tie rods 218. Hardware members 214-220 extend through holes formed in the clamping rings 216 to engage with blind holes formed in the ends of the tie rods 218.

Restraining straps 206 extend radially outwardly from the perimeter portion of the flexible discs 214 to pass through a first slot 224 formed in a side margin of an outer ring 226 that surrounds the outer circumference of the toroid 204. The strap extends through a slot 228 formed in the side wall 244 of a cover structure that surrounds exciter coil 212. An enlarged end portion 230 is affixed to the end of the restraining strap 206 to prevent the restraining strap from disengaging from the slot 228. Buckles 232 are provided in the straps 206 to adjust the lengths of the straps to place the desired tension on the straps. The inward ends of the restraining straps 206 can be securely attached to the flexible discs 214 by any convenient means, for example, by thermal welding, by an adhesive, by a mechanical fastener, or a combination of these or other fastening means.

Figure 4:
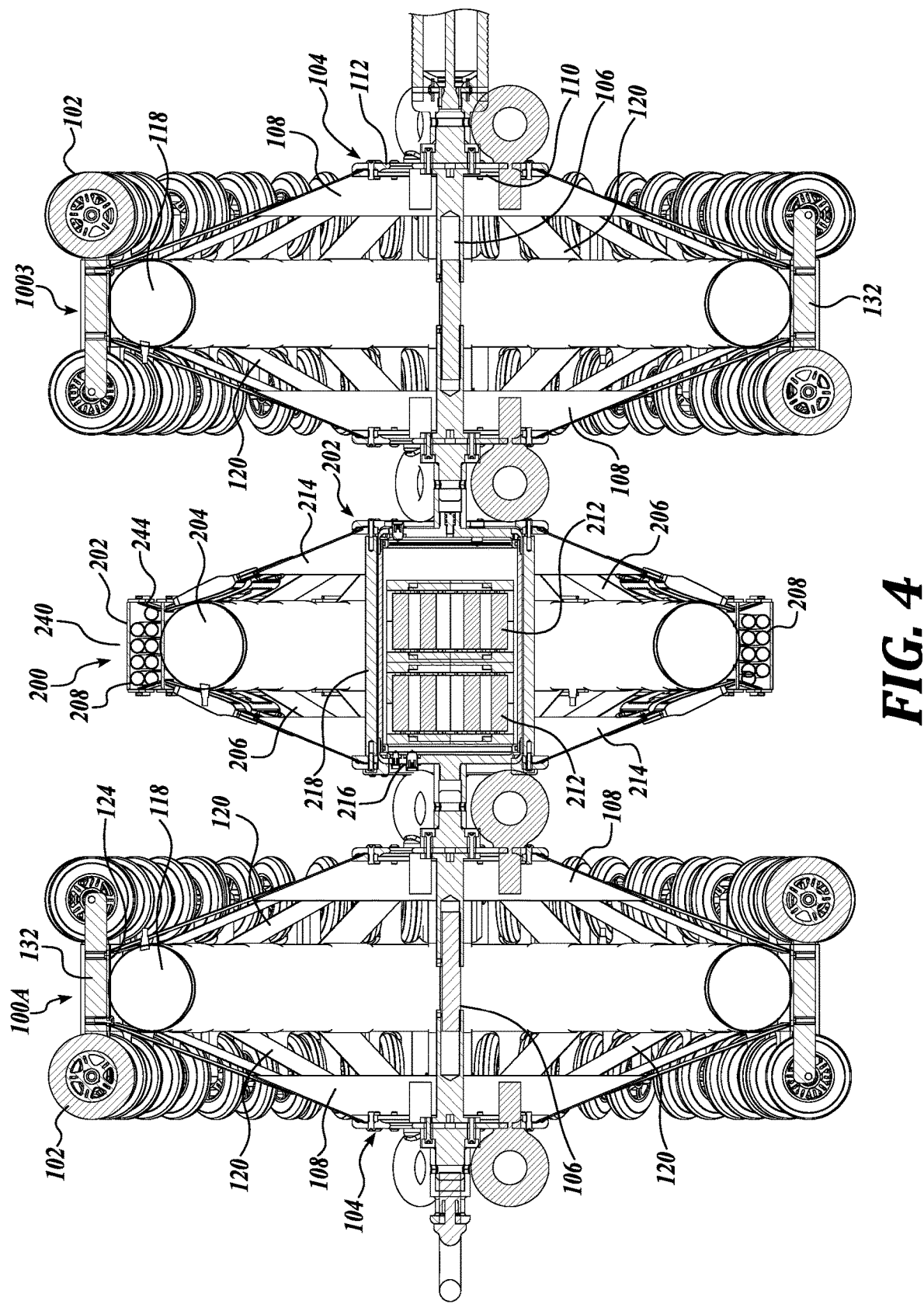
FIG. 4 is an enlarged cross-sectional view of a portion of FIG. 3.
Figure 13:
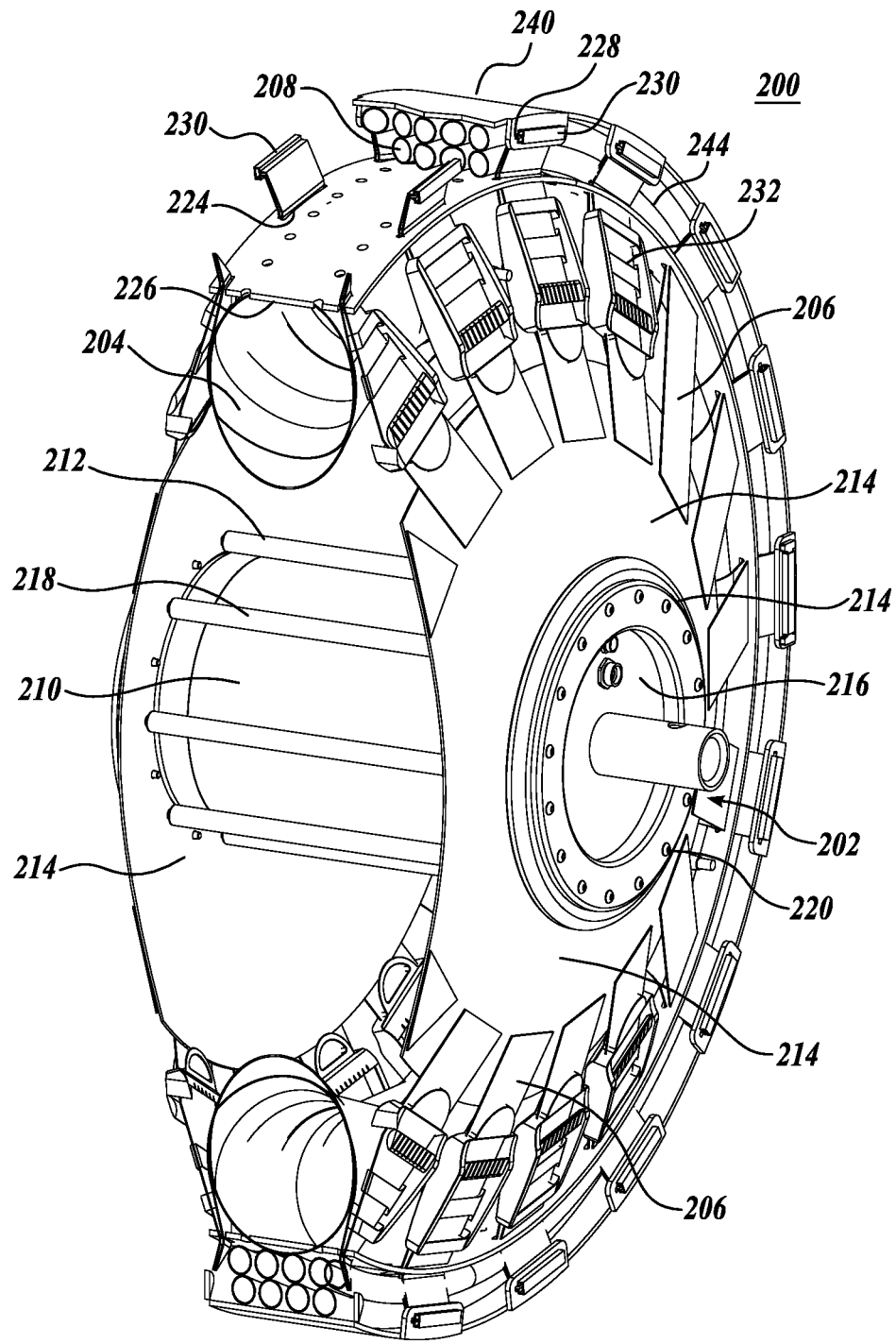
FIG. 13 is a pictorial view of an exciter centralizer of FIG. 1, shown with portions broken away.

As discussed above, a plurality exciter coils 212 extend circumferentially around the exterior of the outer ring 226. Two rows of coils to follow are illustrated in FIGS. 4 and 13; however, the number of coils and rows of coils from that shown in the FIGS. 4 and 13 can be varied so as to generate the desired level of alternating magnetic field, which couples with the ferrous metal over pipeline to induce eddy currents, which in turn generate their own magnetic fields to be sensed by the collapsible/erectable detector centralizer 300.

The exciter coils 208 are disposed within the cover structure 240 for holding the exciter coils in place. The cover structure 240 includes an outer surface 242 surrounding the coils 208 and side walls 244 extending radially inwardly from the side margins on the outer surface 242 to be held in place by the restraining straps, described above. It will be appreciated that by the foregoing construction, it is not necessary to assemble the exciter coils onto the exciter unit centralizer 200 once the centralizer 200, in collapsed form, has been placed into the interior of the pipeline to be inspected. Rather it is only necessary to attach the exciter unit centralizer with the other components of 100 and 300 of the inspection tool 20. Once the exciter centralizer unit 200 has been position within the pipeline to be inspected, the unit can be erected by, for example, inflating the toroid 204, whereupon the centralizer unit 200 is substantially ready for use in the sense that assembly of the unit 200 is not required.

Next referring primarily to FIGS. 5, 8, 11, 12, and 15, the collapsible detector unit centralizer 300 is illustrated as including a hub portion 302 connected to adjacent collapsible centering/guiding centralizer's 100 using swivel joints between. A collapsible/erectable superstructure in the form of an inflatable toroid 304 surrounds the hub portion and is tied to the hub portion by a series of restraining straps or lines 306 that radiate out from the hub portion. When inflated, the toroid 304 carries and supports a plurality of eddy current detectors 308 disposed around the circumference of the toroid.

The hub portion 302 includes an outer shell 310 for housing signal receiving units 312 therein. Flexible discs 314, similar to flexible discs 214, are position between the outer shell 310 and exterior clamping rings 316 located at each end of the hub portion 302. The clamping rings 316 are clamped together and against the ends of the outer shell 310 by tie rods 318. Hardware members 320 extend through holes formed in the clamping rings 316 to engage with blind holes formed in the ends of the tie rods 318.

Connectors 322 project outwardly from the clamping rings 316 to engage connection wires 324 leading to signal sensing units 308. In a manner typical of an eddy current ILI tool, the sensing units 308 are able to detect changes in the eddy currents generated by the exciter unit 200 due to defects or other discontinuities in the pipeline being detected. The eddy current based signals detected by the sensing units 308 are transmitted to the signal receiving unit 312 housed in hub portion 302.

Restraining straps 306 extend radially outwardly from the perimeter portion of the flexible discs 314 to pass through a slot 330 formed in a side margin of an outer ring 332 that surrounds the outer circumference of the inflatable toroid 304. Enlarged end structures 334 are attached to the ends of the straps 306 to prevent the straps from disengaging from the outer ring 332. The inner ends of the restraining straps 306 can be securely attached to the flexible discs 314 by any convenient means, for example, by thermal welding, by an adhesive, by a mechanical fastener, or a combination of these fastening or other means.

Figure 5:
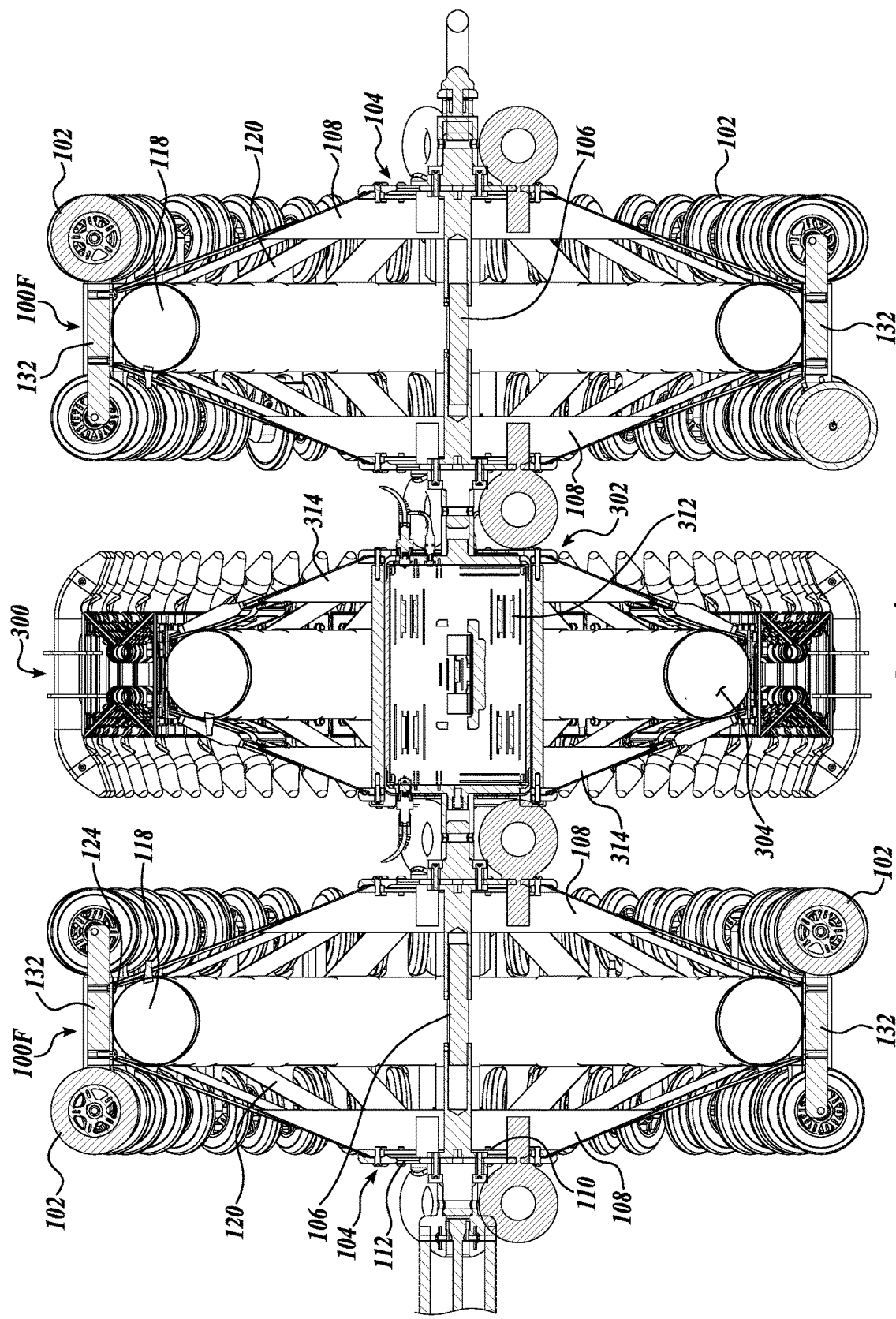
FIG. 5 is an enlarged cross-sectional view of a portion of FIG. 3.
Figure 6:
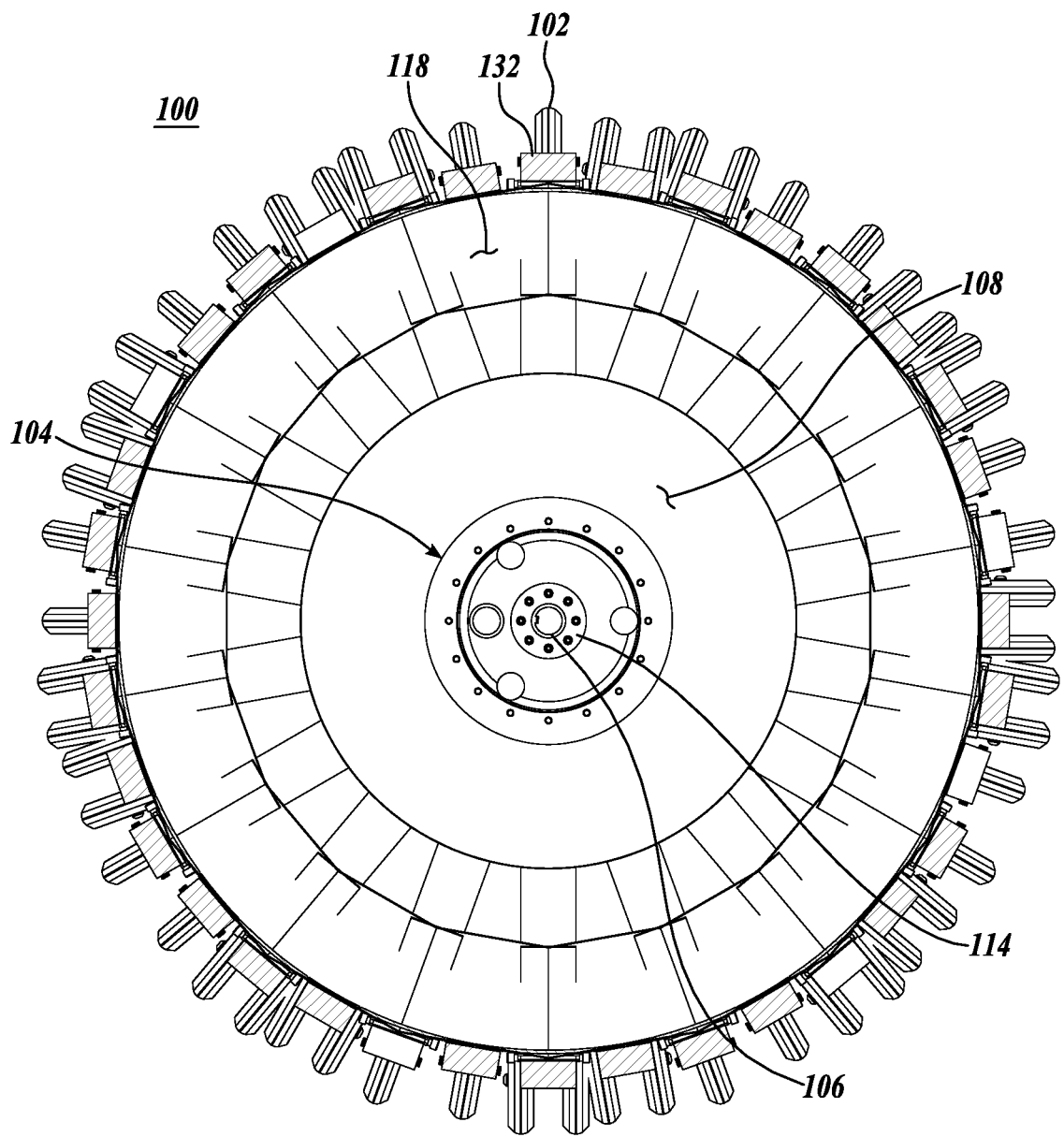
FIG. 6 is a cross-sectional view of FIG. 2, taken along lines 6-6 thereof.
Figure 7:
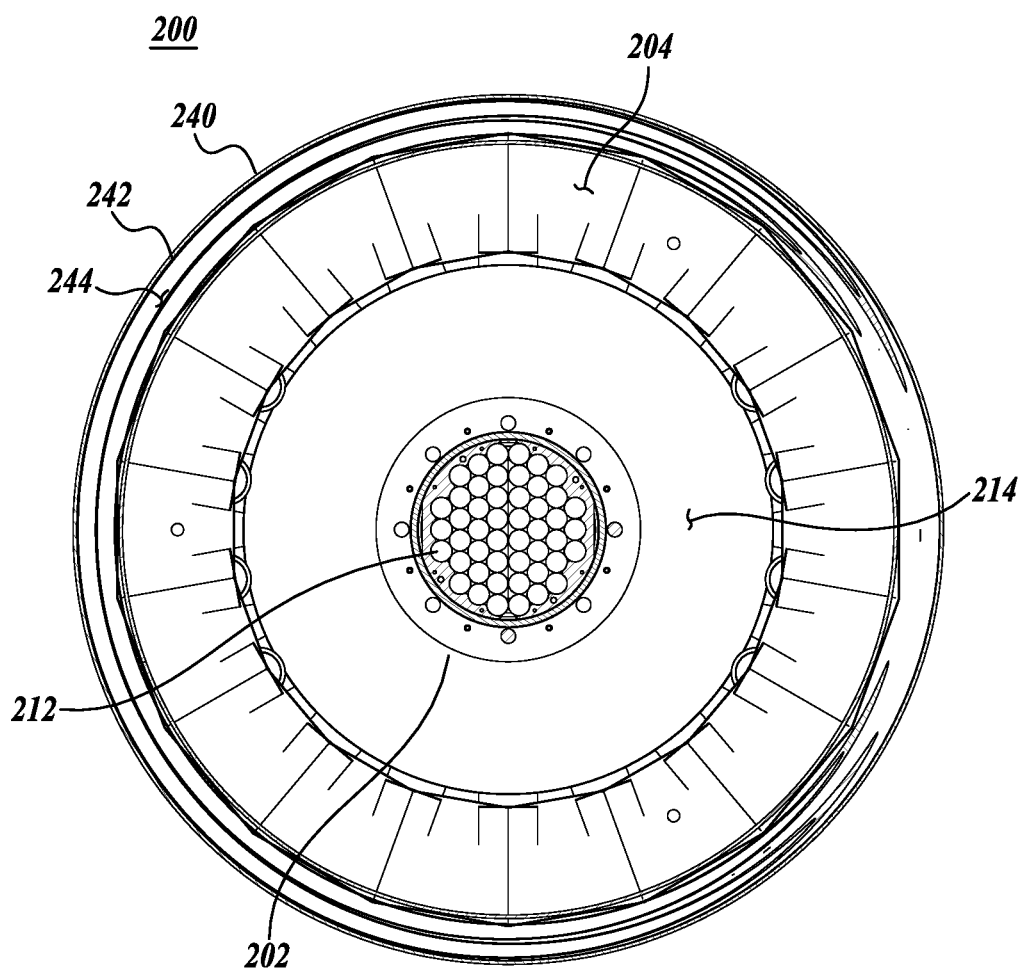
FIG. 7 is a cross-sectional view of FIG. 2, taken along lines 7-7 thereof.
Figure 8:
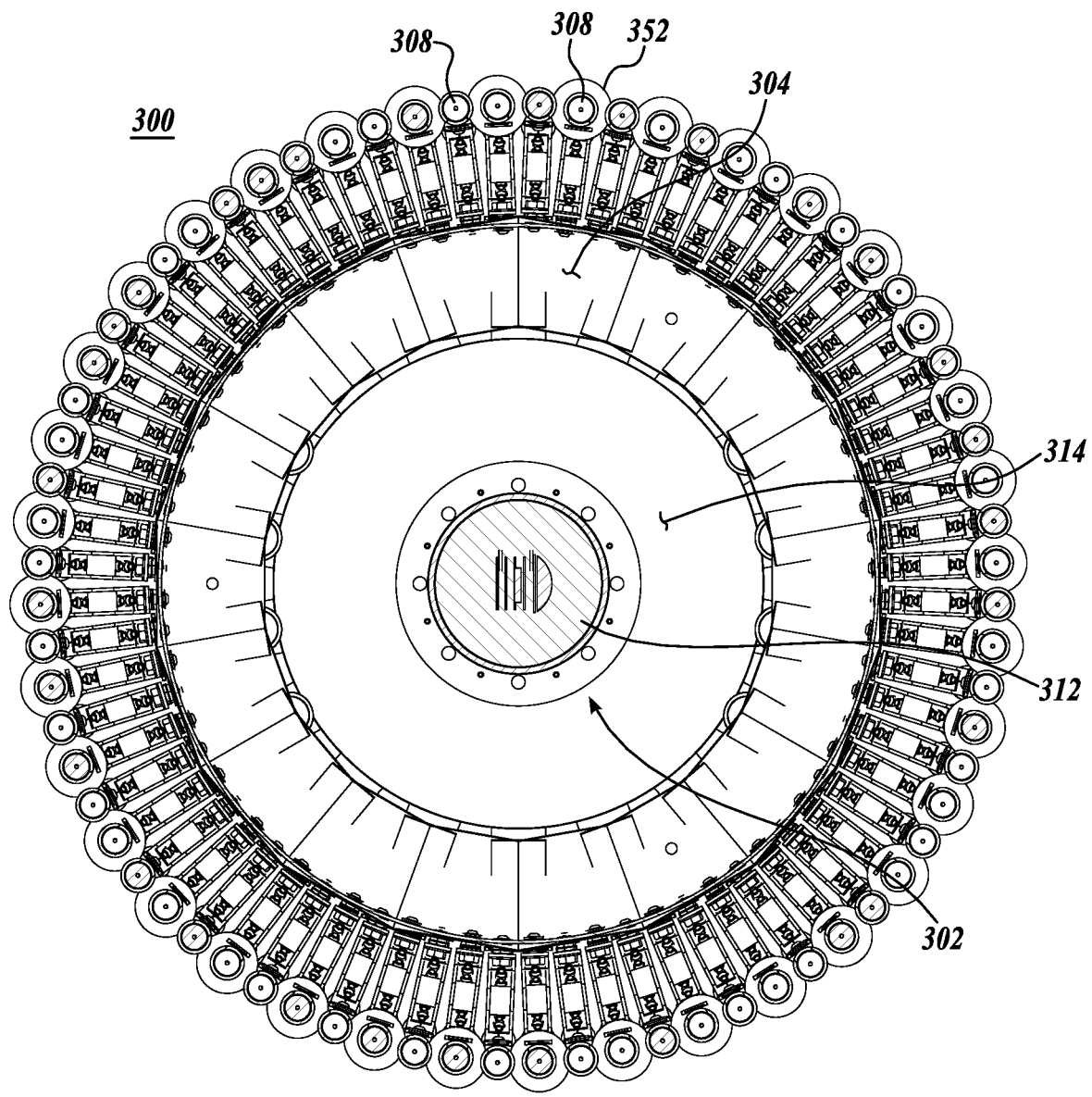
FIG. 8 is a cross-sectional view of FIG. 2, taken along lines 8-8 thereof.
Figure 9:
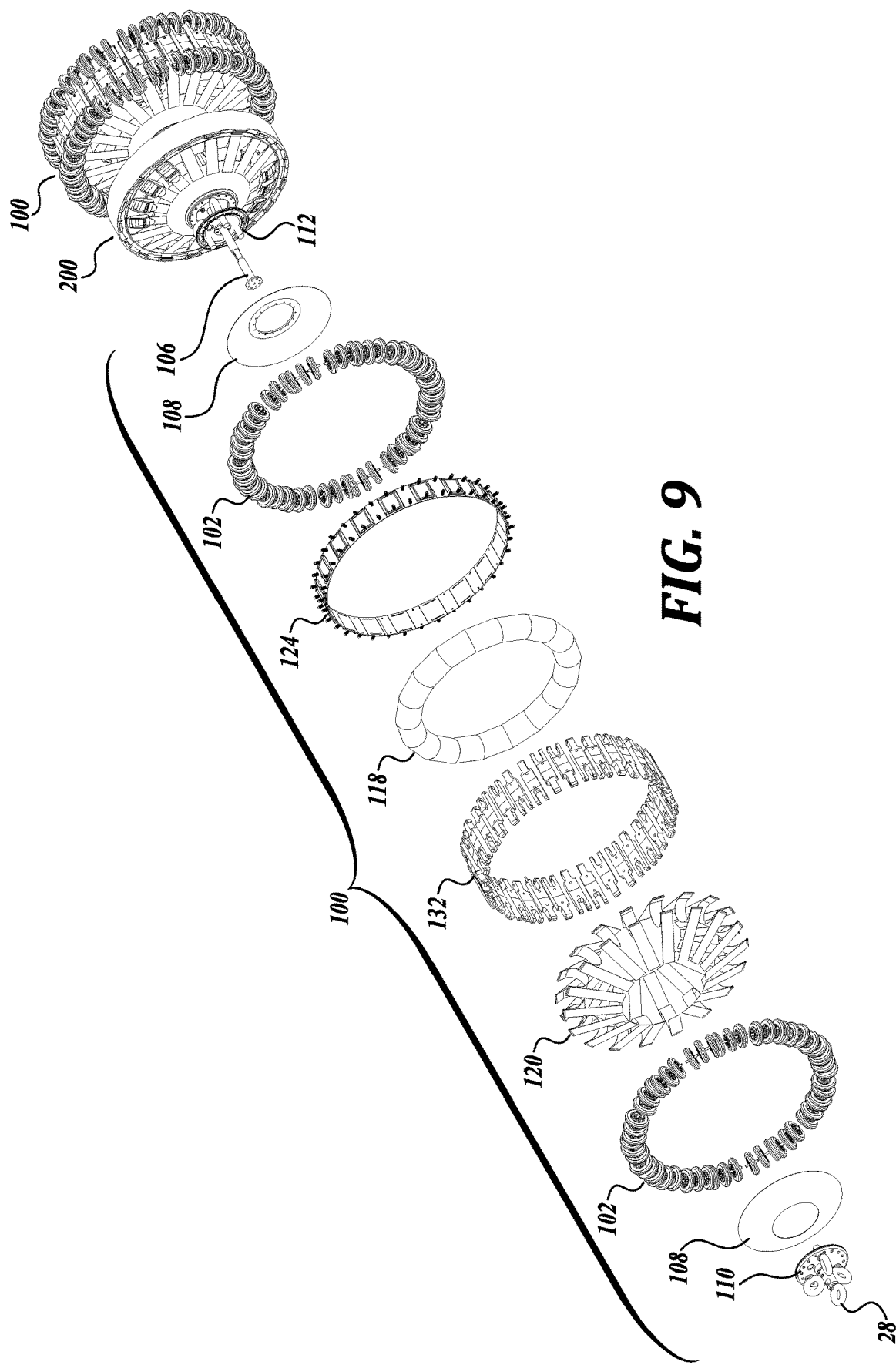
FIG. 9 is an exploded pictorial view of a guiding centralizer of FIG. 1.
Figure 10A:
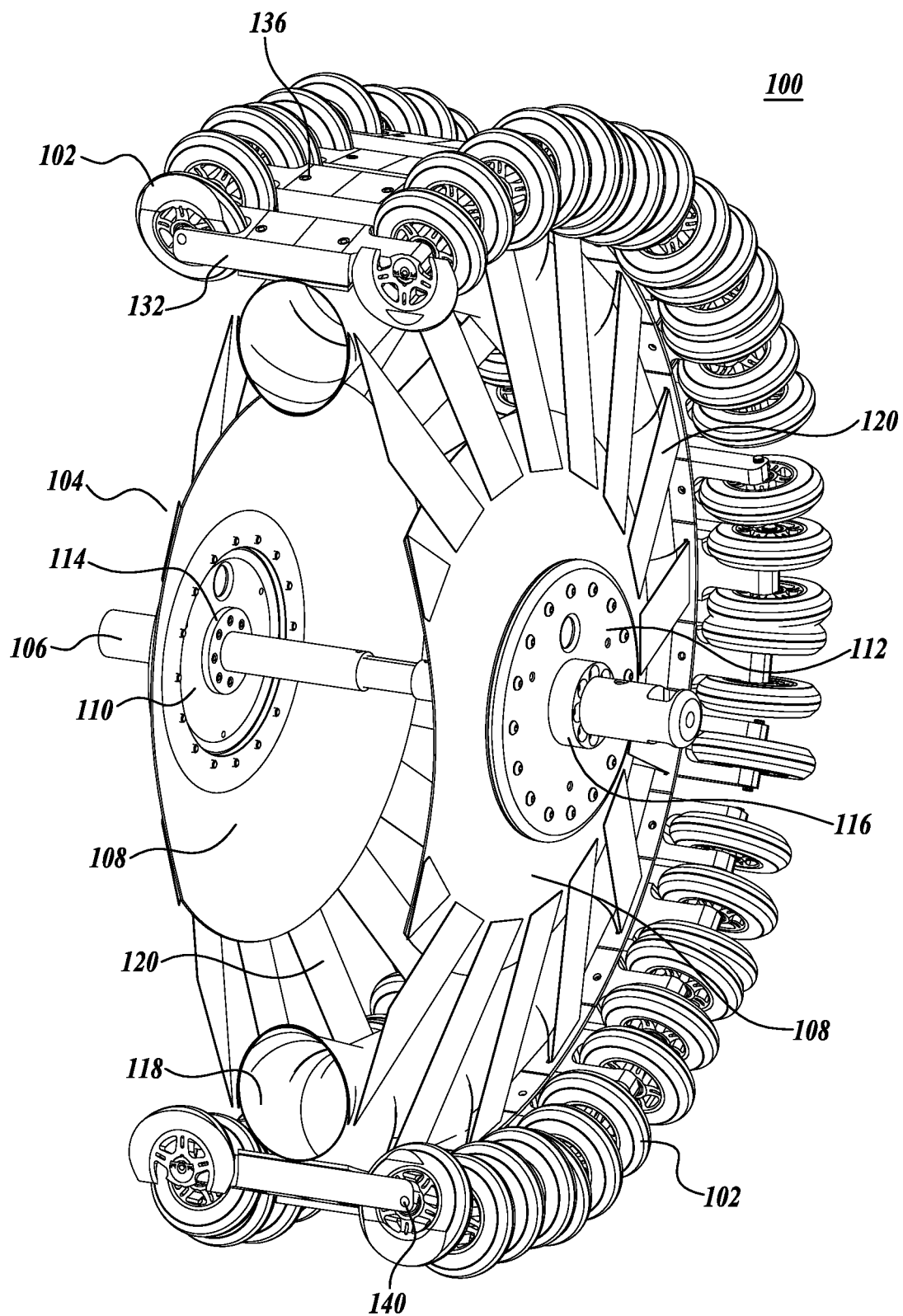
FIG. 10A is a pictorial view of a guiding centralizer of FIG. 1, shown with portions broken away.
Figure 10B:
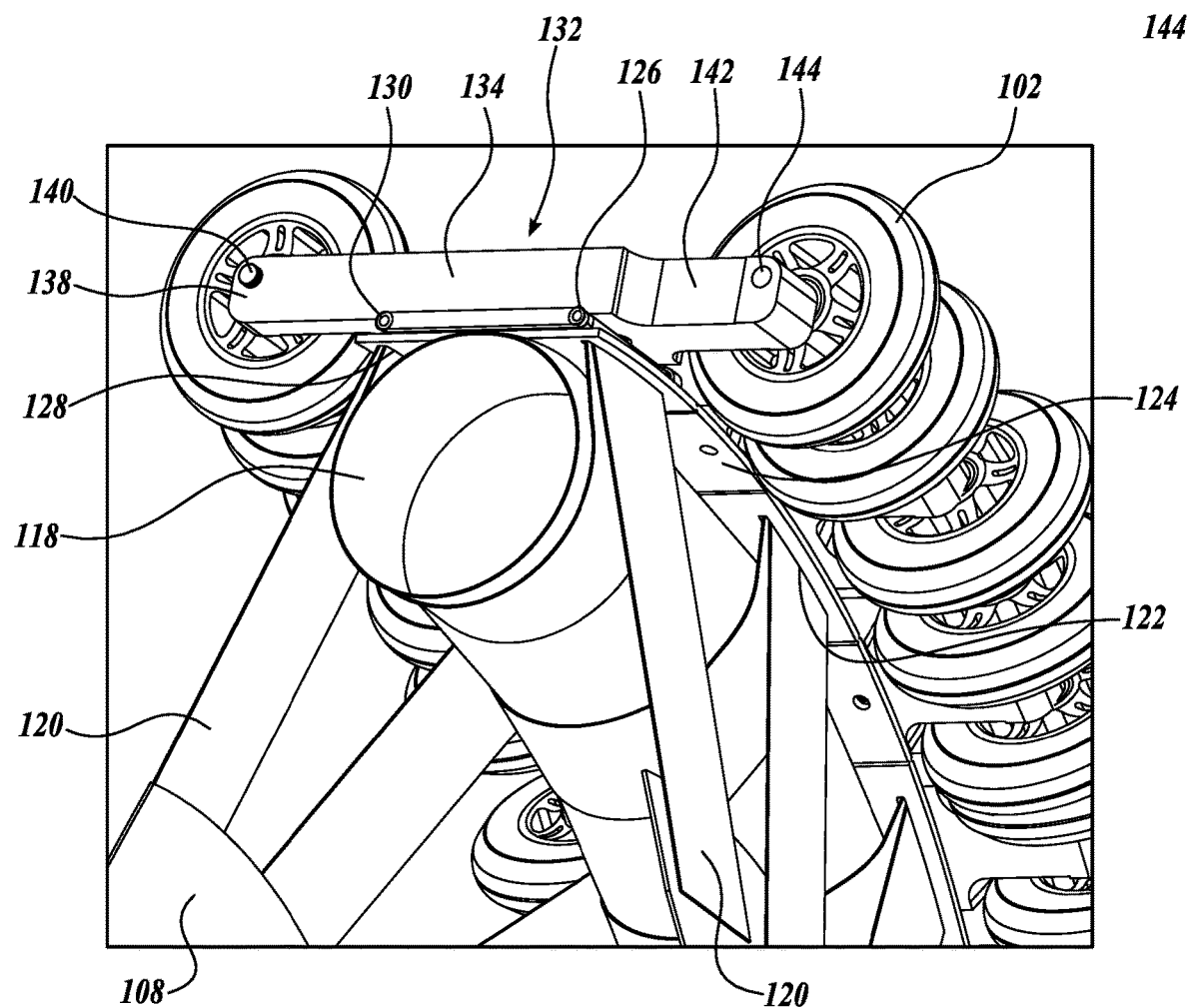
FIG. 10B is an enlarged, fragmentary pictorial view of a portion of FIG. 10A.
Figure 11:
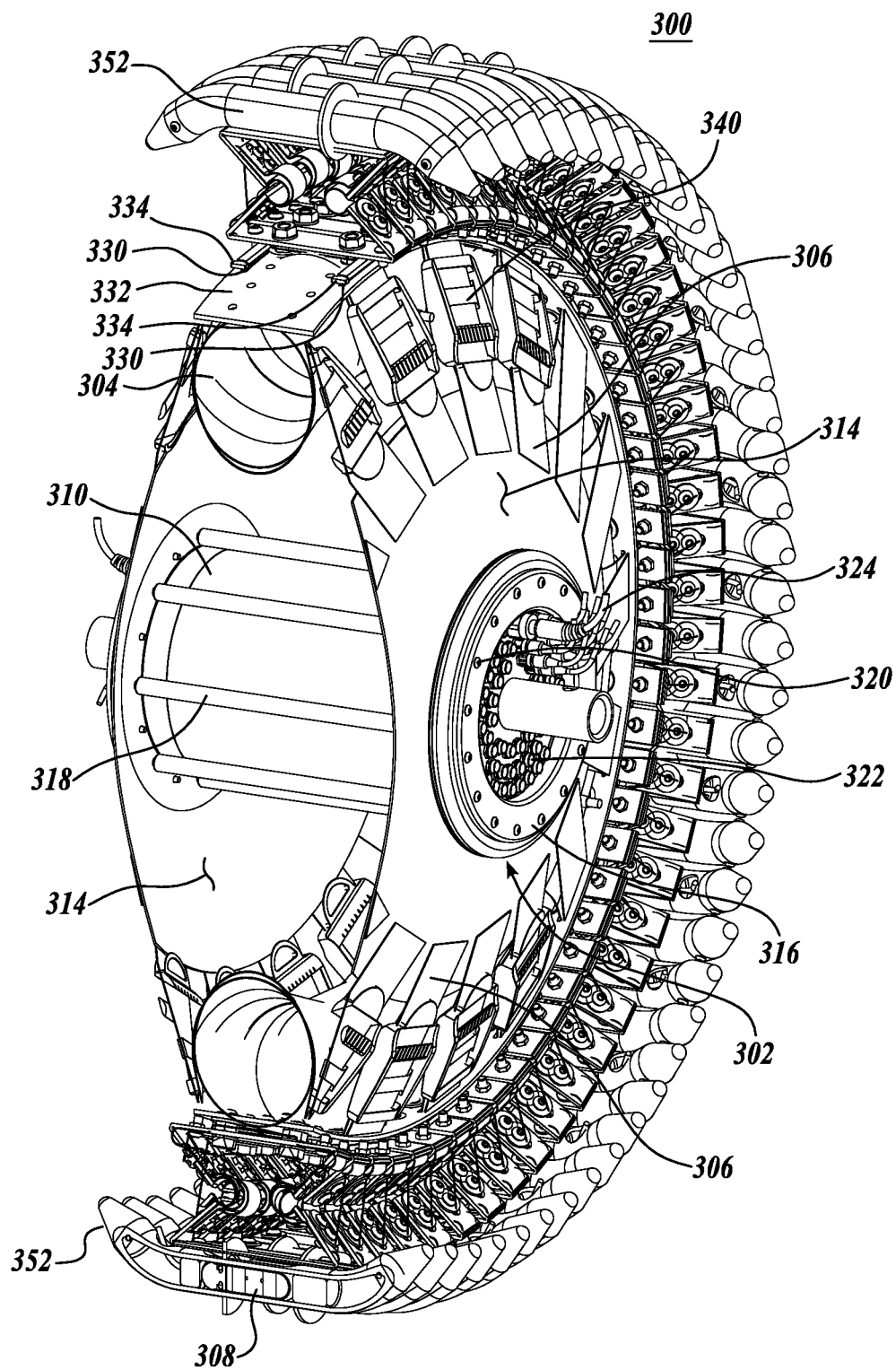
FIG. 11 is a pictorial view of a detecting centralizer of FIG. 1, shown with portions broken away.

As perhaps most clearly shown in FIGS. 5 and 11, take up buckles 340 are engaged with the restraining straps 306. The buckles 340 are used to adjust the tension on restraining straps 306 to help ensure that the exterior of the detector centralizer 300 is circular in configuration so as to properly position the detector centralizer 300 relative to the interior of the pipeline being inspected.

As discussed above, a plurality of eddy current signal sensing or detecting units 308 are mounted on the exterior of the outer ring 332. The detecting units 308 include detectors 350 positioned within generally tubular shaped, elongate pods 352 extending parallel to axis 30. As shown in the FIGURES, the pods 352 have tapered end portions 354 that terminate at blunt ends which are curved radially inwardly toward the axis 30. This configuration helps to reduce the likelihood that one or more of the pods 352 will catch against the inside surface of the pipeline, especially since the pods are mounted on the outer ring 332 using resilient mounting structures 360.

The mounting structures 360 are in the form of an "hourglass" spring structure. In this regard, the mounting structure 360 includes upper and lower brackets 361, each composed of a longitudinal base 362 and diagonal arms 364 extending away from the base in an inwardly direction. The base 362 of the upper bracket 361 is attached to the adjacent surface of the pond 352, whereas the base 362 of the opposite bracket 361 is attached to the outer ring 332. Hardware assemblies 366 are provided for such attachment.

The upper and lower brackets 361 are attached at their arms 364 by shaped flat springs 368, each having a mounting flange portion 370 to overlie the surface of arms 364 of the mounting brackets 361 and the central arcuate portion 372, which is capable of coiling and uncoiling as the upper and lower brackets 361 move towards and away from each other. It can be appreciated that this function of the springs 368 is made possible by constructing the springs from spring steel or similar material that is capable of flexing. The mounting flange portions 370 are attached to bracket arms 364 by hardware assemblies 374. As can be appreciated, there is little resistance to the ability of the bracket arms 364 to pivot relative to bracket base 362. As such, the position of the bracket arms 364 relative to the corresponding base 362 is dictated by the position/configuration of springs 368.

Figure 12:
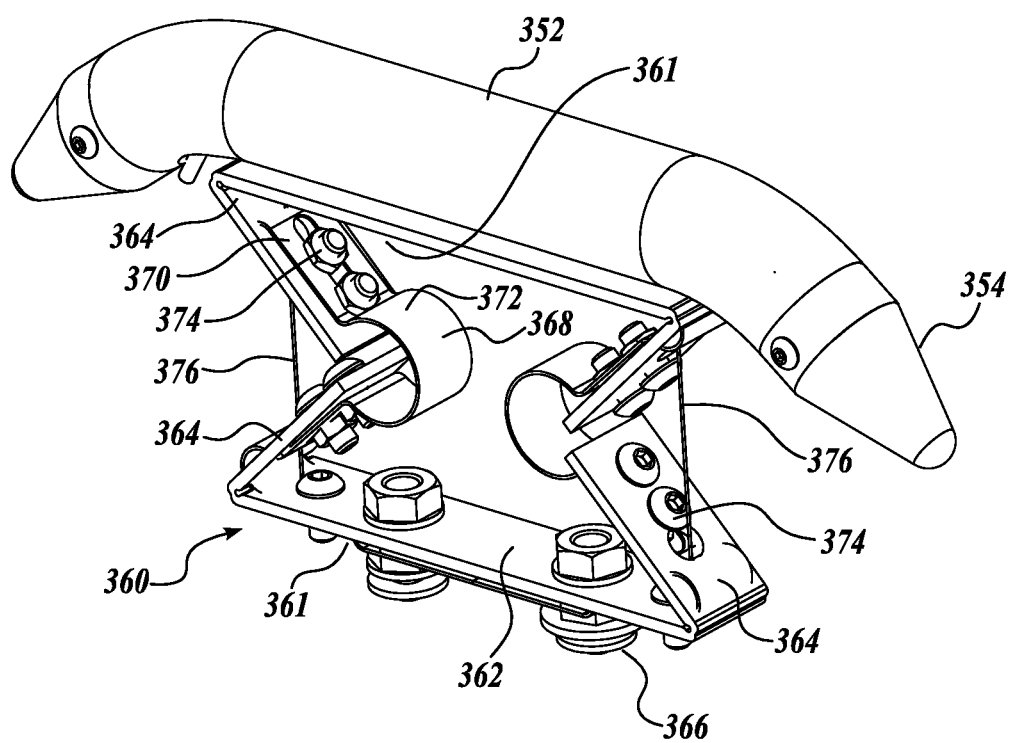
FIG. 12 is an enlarged, fragmentary pictorial view of a portion of FIG. 11.

As shown in FIG. 12, a cord 376 extends between the base structures of the mounting structures 361 to limit the unwinding of the springs 368, and thus limit the distance separating the pods 352 from the outer ring 332. It is to be appreciated that the FIGURES of the present application illustrate only one manner in which the pods 352 may be mounted on the outer ring 332. The pods 352 can be mounted on the outer ring 332 by innumerable other means, while enabling the pods to shift radially inwardly toward axis 30 during use ILI tool 20, for example, when rounding a corner or a bend in the pipeline or when encountering discontinuity, such as the indentation in the pipeline.

It will be appreciated that by mounting the eddy current signal sensing or detecting units 308 on the exterior of the outer ring 332, it is not necessary to assemble the sensing/detecting units onto the exciter unit centralizer 200. After the centralizer 200, in collapsed form, has been placed into the interior of the pipeline to be inspected. it is only necessary to attach the detector unit centralizer with the other components of 100 and 200 of the inspection tool 20. Once the detector centralizer unit 300 has been position within the pipeline to be inspected, the unit can be erected by, for example, inflating the toroid 304, whereupon the detector unit 300 is substantially ready for use in the sense that assembly of the unit 300 is not required.

FIGS. 1, 2, and 3 illustrate the ILI tool 20 in assembled configuration and ready for use to inspect a pipeline. In this regard, the guiding centralizer is 100, the exciter centralizer 200 and the detector centralizer 300 are erected/inflated and interconnected together. However, prior to achieving an assembled configuration, the individual guiding centralizers 100, the exciter centralizer 200, and the detector centralizer 300 were first inserted into the pipeline through a manway or other opening publicize smaller than the erected/inflated circumference of the centralizers 100, 200, and 300. As such, the centralizers were placed into the pipeline in deflated configuration, thereby enabling the diameter of the centralizers to be substantially reduced. For example, guiding centralizer 100, which is 36 inches in diameter when inflated, can be reduced to a width of about 12 inches when deflated so that it can easily fit through a standard 20-inch-wide manway.

Figure 14:
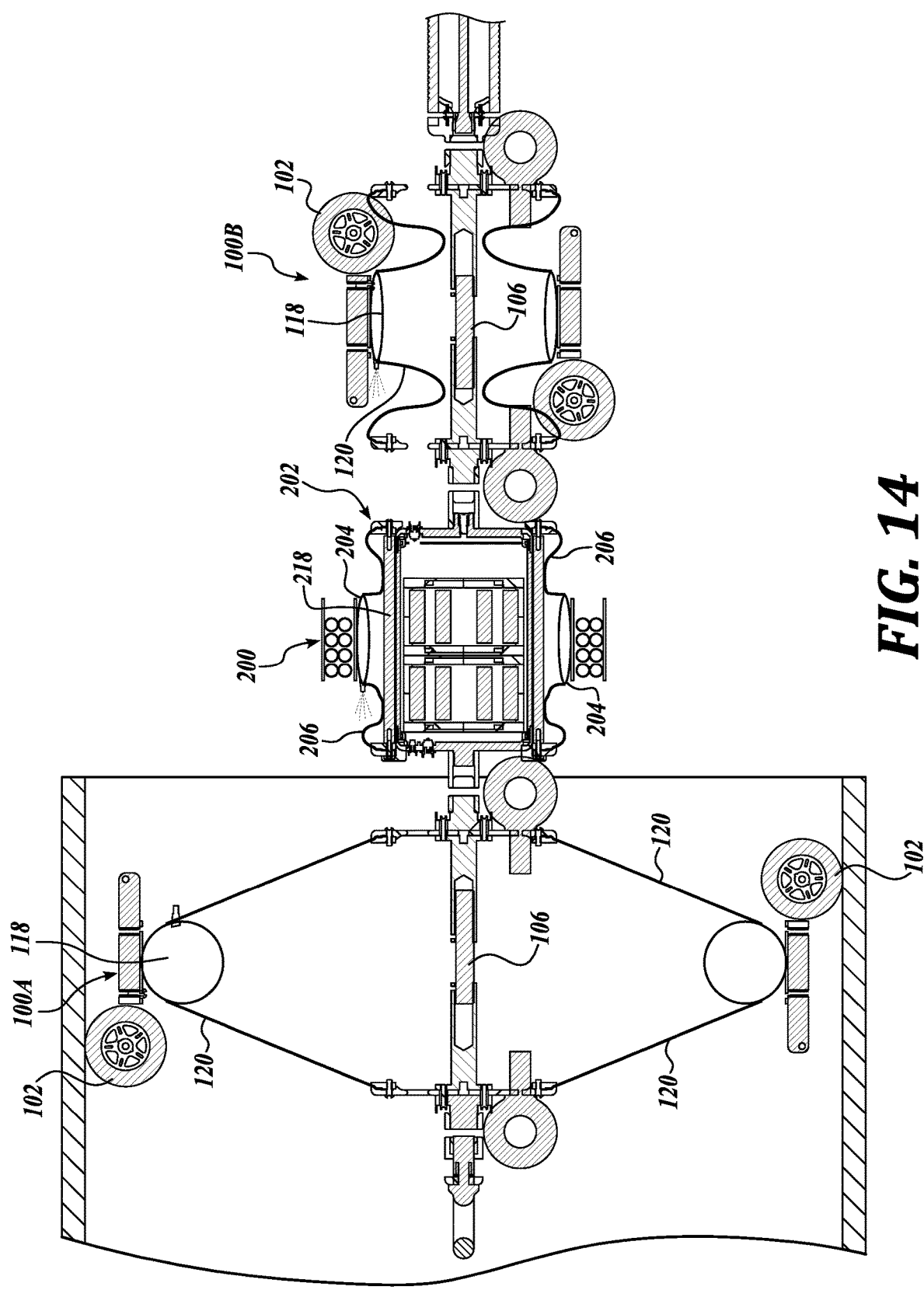
FIG. 14 is a view corresponding to FIG. 4 showing a portion of the tool as collapsed.
Figure 15:
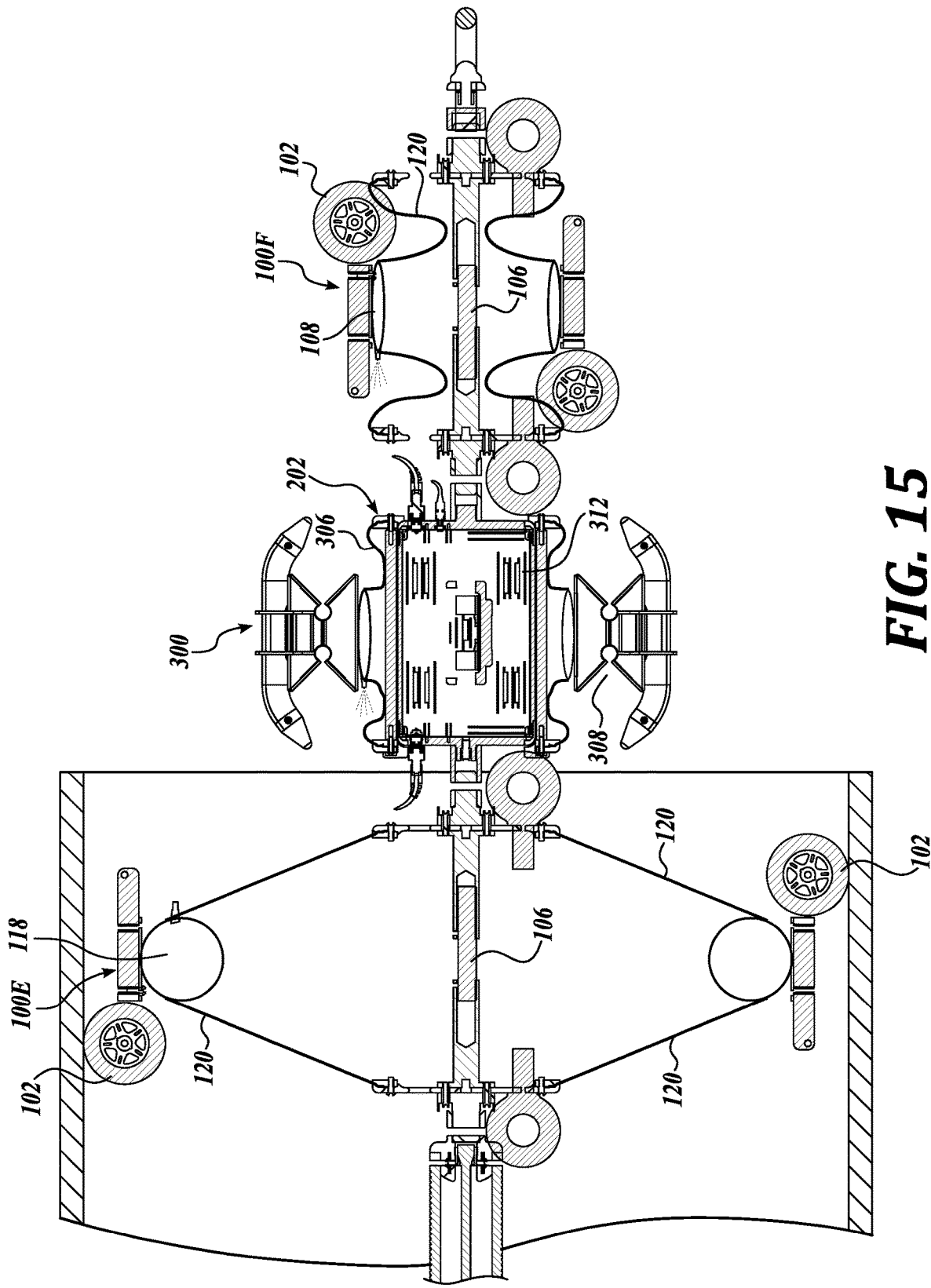
FIG. 15 is a view corresponding to FIG. 5 showing a portion of the tool as collapsed.

Once placed within the pipeline to be inspected, the centralizers 100, 200, and 300 can be attached together in desired configurations and the superstructures of the centralizers inflated either manually or by a powered source of pressurized air. FIGS. 14 and 15 show the leading centralizer 100 erected/inflated and show the centralizers 200 and 300 and the trailing centralizers 100 in collapsed/deflated configuration. As noted above, to facilitate inflation, the toroid superstructures may each include a number of insulation valves, so that likely a valve is near the location of work person tasked with inflating the toroids. Once the centralizers 100, 200, and 300 have been assembled and the respective superstructures inflated, the tool is ready for use without assembly of the components of the centralizers. As mentioned above, the tool 20 is towed through the pipeline using a towing line attached to the forward end of the tool, and the restraining line attached to the trailing end of the tool.

It will be appreciated that the inflatable tool 20 can save significant time in readying the tool for use since the various centralizers 100, 200, 300 did not themselves be disassembled for delivery to the interior of the pipeline and then reassembled for use. Similarly, after the completion of the inspection of the pipeline, it is not necessary to disassemble the various centralizers in order to remove the centralizers from the pipeline. Rather, it is only necessary to decouple the centralizers from each other and deflate the centralizers so they occupy a reduced size that is small enough to be removed from the pipeline as a complete unit.

While illustrative embodiments have been illustrated and described, it will be appreciated that various changes can be made therein without departing from the spirit and scope of the invention. For example, rather than using a superstructure in the form of a singular inflatable toroid, such as toroids 118, 204, or 304, a plurality of smaller cross-sectional diameter inflatable tubular structures can be utilized. As an example, six such smaller diameter inflatable tubular structures can be arranged to cooperatively define superstructure of an overall cross-sectional shape and size similar to toroids 118, 204, or 304. Rings can extend around such tubular structures so as to define the overall cross-sectional shape of the resulting superstructure. Also, the inflatable tubular structures can be interconnected with compressed air flow communication so that they are all inflated simultaneously, rather than having to inflate each tubular structure individually.

A further alternative to a superstructure can be constructed from solid arcuate segments that cooperatively define a toroid shape corresponding to toroids 118, 204, or 304. For example, the superstructure could be composed of 8, 10, 12, etc. segments that are hinged together, but are allowed to collapse into, for example, and oval-shaped, so as to reduce the overall envelope of the centralizer to a small enough size to enable the centralizer to be inserted into pipeline being inspected through a smaller entrance opening. The collapsed superstructure can be directed by tightening a cable that extends either through or around the segments of the superstructure, thereby to cause the segments to assume a circular shape.

As another alternative the superstructure can be composed of solid arcuate segments that are telescopic really engageable with each other, to be able to telescope between and erected circular size and smaller circular size. Telescoping spokes or other supports may extend between the segments of the superstructure and the hub structure to change in length as the superstructure is collapsed or erected. Once the superstructure is fully erected, the spokes can be locked to maintain their extended length thereby supporting the superstructure relative to the hub structure.

Further, these alternatives superstructures may employ outer rings similar to outer rings 124, 226, and 332 so that assembly of the wheels, exciter coils, or sensing/detecting units on respective centralizers, such as centralizers 100, 200, or 300, is not required.

The embodiments of the invention in which an exclusive property or privilege is claimed are defined as follows:

1. A collapsible centralizer for positioning measuring/testing equipment within the interior of a pipeline while traveling through the pipeline, comprising:
   a hub portion defining a longitudinal axis extending through the hub portion;
   a collapsible superstructure encircling the hub portion;
   a plurality of tethering lines radiating from the hub portion to the collapsible superstructure to inter-connect the superstructure to the hub portion;
   wherein the superstructure, when in collapsed configuration, occupies a reduced size configuration relative to the size of the centralizer when in erected configuration, and remains in the collapsed configuration whether within or without the pipeline until placed in the erected configuration.

2. The collapsible centralizer according to claim 1, wherein when the superstructure is in the erected configuration, the plurality of tethering lines are in a taut condition.

3. The collapsible centralizer according to claim 1, wherein the plurality of tethering lines are loaded under tension when the collapsible superstructure is in the erected configuration.

4. The collapsible centralizer according to claim 1, wherein the superstructure when erected is configured to carry a component selected from the group consisting of: guide wheels, signal generators and signal detectors through the pipeline.

5. The collapsible centralizer according to claim 4, wherein the selected component is mounted on the superstructure when the superstructure is in the collapsed configuration so that when the superstructure is erected, the component is in position to perform its function.

6. The collapsible centralizer according to claim 4, wherein the guide wheels are mounted on trucks disposed about the circumference of the superstructure to rotationally mount the guide wheels about axes transverse to the longitudinal axis of the hub portion.

7. The collapsible centralizer according to claim 1, wherein the hub portion is configured to receive and carry a component selected from the group consisting of: a battery, a signal exciter module, a signal receiver, a signal processor, a signal transmitter, a signal recorder.

8. The collapsible centralizer according to claim 7, wherein the signal exciter module is carried by the hub portion and is paired with signal exciter units carried by the superstructure.

9. The collapsible centralizer according to claim 7, wherein the signal receiver is carried by the hub structure portion and is paired with signal detectors carried by the superstructure.

10. A plurality of the collapsible centralizers according to claim 1, wherein the hub portions of the collapsible centralizers are interconnected together.

11. A collapsible centralizer for positioning measuring/testing equipment within the interior of a pipeline while traveling through the pipeline, comprising:
    a hub portion defining a longitudinal axis extending through the hub portion;
    a collapsible superstructure encircling the hub portion;
    a plurality of tethering lines radiating from the hub portion to the collapsible superstructure to inter-connect the superstructure to the hub portion; and
    wherein the collapsible superstructure is inflatable into erected configuration and deflatable into collapsed configuration.

12. The collapsible centralizer according to claim 11, wherein the inflatable superstructure comprises an inflatable toroid that encircles the hub portion.

13. A collapsible centralizer for positioning measuring/testing equipment within the interior of a pipeline while traveling through the pipeline, comprising:
    a hub portion defining a longitudinal axis extending through the hub portion;
    a collapsible superstructure encircling the hub portion;
    a plurality of tethering lines radiating from the hub portion to the collapsible superstructure to inter-connect the superstructure to the hub portion;
    wherein the tethering lines are loaded under tension when the collapsible superstructure is in erected configuration; and
    tensioners for adjusting the tension load on the tethering lines when the superstructure is in the erected configuration.

14. A collapsible centralizer for positioning measuring/testing equipment within the interior of a pipeline while traveling through the pipeline, comprising:
    a hub portion defining a longitudinal axis extending through the hub portion;
    a collapsible superstructure encircling the hub portion;
    a plurality of tethering lines radiating from the hub portion to the collapsible superstructure to inter-connect the superstructure to the hub portion;

wherein the superstructure when erected is configured to carry a component selected from the group consisting of guide wheels, signal generators, and signal detectors through the pipeline; and wherein the signal detectors comprise sensors disposed within pods spaced along the circumference of the superstructure.

15. The collapsible centralizer according to claim 14, wherein the pods are mounted on the superstructure by resilient mounting structures to enable the pods to retract toward the superstructure when subjected to a load.

16. The collapsible centralizer according to claim 14, further comprising a signal receiver module which is paired with the signal detectors, said signal receiver module disposed within the hub portion.

17. A collapsible centralizer for positioning measuring/testing equipment within the interior of a pipeline while traveling through the pipeline, comprising:
a hub portion defining a longitudinal axis extending through the hub portion;
a collapsible superstructure encircling the hub portion;
a plurality of tethering lines radiating from the hub portion to the collapsible superstructure to inter-connect the superstructure to the hub portion;
wherein the superstructure when erected is configured to carry a component selected from the group consisting of guide wheels, signal generators, and signal detectors through the pipeline; and
comprising signal exciter units positioned around the circumference of the superstructure.

18. The collapsible centralizer according to claim 17, further comprising a signal exciter module which is paired with the signal exciter units, said signal exciter module disposed within the hub portion.

19. An in-line inspection tool for a pipeline, comprising:
a plurality of centralizers, each comprising a hub portion defining a longitudinal axis extending through the hub portion; an inflatable superstructure encircling the hub portion, and a plurality of tethering lines radiating from the hub portion to the superstructure to position the superstructure relative to the hub portion;
wherein the superstructure when inflated is configured to carry a component selected from the group consisting of guide wheels, signal generators, and signal detectors through the pipeline.

20. The inspection tool according to claim 19, further comprising:
an exciter module which is paired with the signal generators and a signal receiver module which is paired with the signal detectors; and
wherein the exciter module and signal receiver module are disposed within a respective hub structure.

21. A method of deploying a collapsible inline inspection tool into a pipeline having an access location, comprising:
prior to being placed into the pipeline, collapsing at least one guiding centralizer, collapsing an exciter unit centralizer and collapsing a detector unit centralizer;
placing the at least one collapsed guiding centralizer into the pipeline through the access location;
placing the collapsed exciter unit centralizer into the pipeline through the access location;
placing the collapsed detector unit centralizer into the pipeline through the access location;
linking together the at least one collapsed guiding centralizer with the collapsed exciter unit centralizer and the collapsed detector unit centralizer; and
erecting the at least one collapsed guiding centralizer, the collapsed exciter unit centralizer and the collapsed detector unit centralizer into erected configurations to thereby assume configurations larger in size than when in collapsed configurations.

22. The method of claim 21, wherein the at least one collapsed guiding centralizer, the collapsed exciter unit centralizer and the collapsed detector unit centralizer comprise inflatable superstructures that encircle hub portions and transform the at least one guiding centralizer, the exciter unit centralizer, and the detector unit centralizer into erected configuration by inflating the respective superstructures.

23. The method of claim 22, wherein the superstructures comprise inflatable toroids that encircle the hub portions.

* * * * *